United States Patent
Oshima (10) Patent No.: US 9,327,621 B2
(45) Date of Patent: May 3, 2016

(54) STORAGE STRUCTURE OF OFF-ROAD VEHICLE

(71) Applicant: HONDA MOTOR CO., LTD., Tokyo (JP)

(72) Inventor: Tadashi Oshima, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/496,419

(22) Filed: Sep. 25, 2014

(65) Prior Publication Data

US 2015/0091323 A1    Apr. 2, 2015

(30) Foreign Application Priority Data

Sep. 30, 2013 (JP) .................................. 2013-205157

(51) Int. Cl.
*B60N 2/36* (2006.01)
*B60N 2/30* (2006.01)

(52) U.S. Cl.
CPC ................ *B60N 2/36* (2013.01); *B60N 2/3013* (2013.01); *B60N 2002/363* (2013.01); *B60N 2205/35* (2013.01)

(58) Field of Classification Search
CPC ........ B60N 2/36; B60N 2/005; B60N 2/3013; B60N 2002/363; B60N 2205/35
USPC ........ 296/24.34, 37.6, 37.5, 64, 66, 65.16, 69
See application file for complete search history.

(56) References Cited

U.S. PATENT DOCUMENTS

| 8,328,261 | B2 | 12/2012 | Kanazawa et al. |
| 8,567,846 | B1 * | 10/2013 | Stevens ..................... B60N 2/36 296/64 |
| 8,672,387 | B1 * | 3/2014 | Kaku ....................... B60R 7/04 296/65.05 |

(Continued)

FOREIGN PATENT DOCUMENTS

| JP | 2005-193802 A | 7/2005 |
| JP | 2005-193894 A | 7/2005 |
| JP | 2009-179300 A | 8/2009 |

OTHER PUBLICATIONS

Notification of Reasons for Refusal for Japanese Patent Application No. 2013-205157, Issued by Japanese Patent Office, on May 12, 2015.

*Primary Examiner* — Jason S Morrow
(74) *Attorney, Agent, or Firm* — Honda Patents & Technologies North America, LLC; Clifford B Vaterlaus (57) ABSTRACT

A storage structure of an off-road vehicle includes a front row seat, a back row seat capable of switching between a usage position where a passenger sits, and a stowed position, a back row floor where a passenger seated in the back row seat places his feet when the back row seat is in the usage position or forms a portion of the storage structure, creating a storage space when the back row seat is in the stowed position, and rear doors. In the stowed position, the back row seat covers an upper part of the upper space of the back row floor, and the rear doors cover a side part of the upper space of the back row floor forming a rear storage section and the back row seat concurrently provide a load-carrying platform.

20 Claims, 9 Drawing Sheets

(56) References Cited

U.S. PATENT DOCUMENTS

| | | | |
|---|---|---|---|
| 8,714,618 B1* | 5/2014 | Heit | B60P 3/423 |
| | | | 296/64 |
| 8,752,879 B1 | 6/2014 | Heit et al. | |
| 8,783,754 B1* | 7/2014 | Peterson | B60N 2/3013 |
| | | | 296/66 |
| 2005/0134084 A1 | 6/2005 | Rangnekar et al. | |
| 2011/0148088 A1* | 6/2011 | Arnold | B60N 2/3013 |
| | | | 296/64 |
| 2011/0187178 A1* | 8/2011 | King | B62D 25/20 |
| | | | 296/184.1 |
| 2013/0168951 A1* | 7/2013 | Yamamoto | B60R 22/24 |
| | | | 280/807 |
| 2013/0168994 A1* | 7/2013 | Yamamoto | B62D 33/0273 |
| | | | 296/63 |
| 2014/0217767 A1* | 8/2014 | Heit | B60N 2/3013 |
| | | | 296/65.16 |
| 2014/0292027 A1 | 10/2014 | Uchiyama et al. | |

\* cited by examiner

STORAGE STRUCTURE OF OFF-ROAD VEHICLE

CROSS REFERENCES TO RELATED APPLICATIONS

The present application claims priority under 35 U.S.C. §119 to Japanese Patent Application No. 2013-205157, filed Sep. 30, 2013, entitled "Storage Structure for All Terrain Vehicle," the contents of which are incorporated herein by reference in their entirety.

BACKGROUND

1. Field

The present disclosure relates to a storage structure of an off-road vehicle.

2. Description of the Related Art

Conventionally, off-road vehicles include an area for storing a folded back seat. When the back seat is not needed to carry passengers and the cargo area needs to be expanded to carry more cargo, the back seat may be folded in on itself and folded down into an area adjacent to the rear step floor where a person seated in the back seat would normally place his feet. The back seat can be stored in this area to allow for the cargo space to be expanded.

SUMMARY

Because the above-described off-road vehicle stores a folded back seat in the rear step floor area, there is the disadvantage that area above the step floor is not being fully utilized as a storage space on the off-road vehicle. Additionally, conventional design does not provide for easy access to area above the step or back row floor if the cargo bed is expanded and the folded back seat is stowed in this area.

One feature of the present disclosure is to provide a rearward storage structure of an off-road vehicle where a step floor or back row floor can act as a storage space when the back seat is stowed.

In one embodiment, the off-road vehicle according to the present disclosure is provided with: a front row seat; a back row seat that can switch between a usage position for passenger seating, a back row floor where a passenger when seated in the back row seat can place his feet when the back row seat is in the usage position, and rear doors. Wherein the back row seat covers an upper part of an upper space of the back row floor in the stowed position, and the rear doors cover the side parts of an upper space of the back row floor.

In another embodiment, the back row seat is provided with backboards that function as a backrest for passengers seated in the back row seat when in the usage position, and when the back row seat is in a stowed position, the back board functions as a floor panel of the load-carrying platform in a position lower than the upper portion of the rear doors.

Another embodiment of the present disclosure may include, a storage structure of an off-road vehicle, including: a vehicle body frame, at least one front row seat disposed on the vehicle body frame, at least one back row seat disposed behind the front row seat on the vehicle body frame, wherein the back row seat is configured to operate in a usage position or a stowed position. The storage structure includes at least one back row floor adjacent to the at least one back row seat, wherein the least one back row floor is configured to provide an area for passenger feet when the at least one back row seat is in the usage position and wherein the at least one back row floor is configured to form a part of the storage structure when the back row seat is in the stowed position and a least one rear door. The back row seat includes at least one extension section, and the at least one extension section forms a portion of the storage space, when the back row seat is in the stowed position. The at least one rear door is adjacent to the back row floor and the at least one back row seat in a stowed position enclosing the storage space, and forming barrier for a load-carrying platform.

In another embodiment, a rearward storage structure of an off-road vehicle may include: a vehicle body frame, at least one front row seat disposed on the vehicle body frame, a back row seat disposed behind the front row seat on the vehicle body frame, wherein the back row seat includes a first seat and a second seat, each seat being configured to operate in a usage position or a stowed position. The storage structure includes a back row floor adjacent to the back row seat, wherein the back row floor includes a first floor and a second floor, wherein the floors are configured to provide an area for passenger feet when the first or second back row seat is in the usage position and wherein the one or both of the first or second floors are configured to form a part of the storage structure when the first or second back row seats are in the stowed position. The storage structure includes a first rear door adjacent to the first back row seat and a second rear door adjacent to the second back row seat, wherein the first seat includes a first extension section that is adjacent to the first rear door when the first seat is in a stowed position and forms a portion of the storage space. The second seat includes a second extension section that is adjacent to the second rear door when the second seat is in a stowed position and forms a portion of the storage space.

The rearward storage section of the present disclosure can be accessed by opening and closing the left rear door or the right rear door, thereby providing excellent convenience of access to the rearward storage section.

An additional benefit to the present disclosure is that when cargo is placed on the load-carrying platform, the rearward storage section can be accessed by opening the left rear door or the right rear door, without having any effect on load-carrying platform.

Yet another benefit of the present disclosure is easy access to the rearward storage is provided when both the left rear door and the right rear door are opened. The area of the rearward storage when both the right and left doors are opened covers the full width of the off-road vehicle, thereby providing additional convenience and an alternative and extra storage space relative to the cargo area.

Another benefit to the present disclosure is that the rearward storage section can store long cargo that extends from the left to the right of the off-road vehicle because the space between the left rear door and the right rear door extends in the vehicle width direction; furthermore, the operations of loading and unloading the long cargo are simplified, due to the placement of the rearward storage space.

Yet another benefit to the present disclosure is that the strength of the left rear door and the right rear door can be ensured by the left recessed portion and the right recessed portion. At the same time, the size of the storage space of the rearward storage section can be increased by extending the length of the rearward storage section in the vehicle width direction through the left recessed portion of the left rear door and the right recessed portion of the right rear door.

DETAILED DESCRIPTION

A first embodiment of the present disclosure for an off-road vehicle according to the present disclosure is described below with reference to drawings. Note that the drawings are to be viewed according to the orientation of the labels; in the following description, "front", "rear", "left", "right", "up" or "above", and "down" or "below" are from the driver's viewpoint, and as necessary, the front of the vehicle will be labeled "Fr", the rear "Rr", the left side "L", the right side "R", up or above as "U", and down or below as "D". In the drawings, identical or equivalent parts will be identically labeled.

Figure 1:
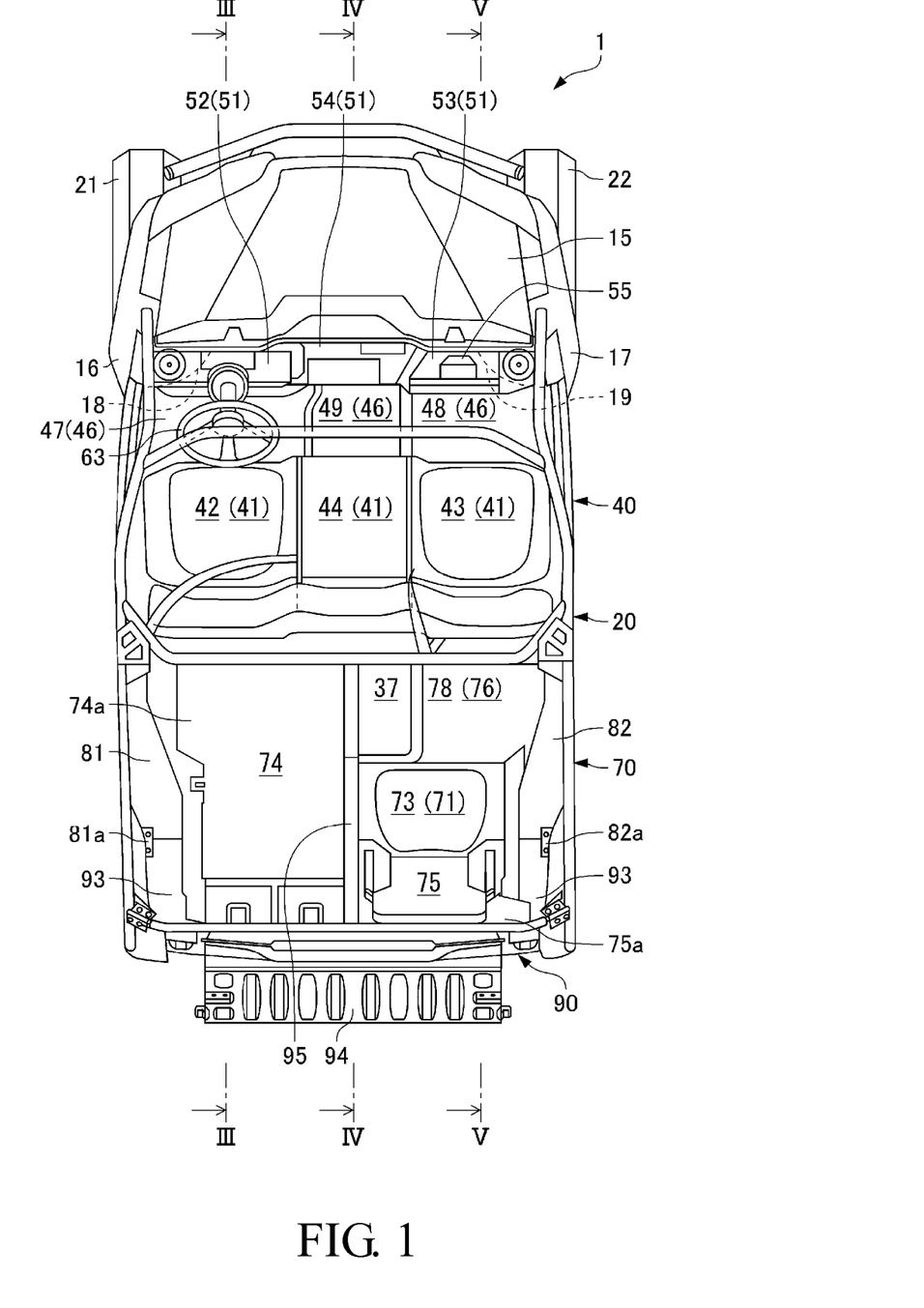
FIG. 1 is a plan view illustrating an embodiment of the off-road vehicle including a rearward storage space according to an embodiment of the present disclosure.

One embodiment of a rearward storage structure of an off-road vehicle 1, is shown in FIGS. 1 to 8. As illustrated in FIG. 1, the off-road vehicle 1 includes a vehicle body frame 10, a left front wheel 21 and a right front wheel 22 disposed in the front section of the vehicle body frame 10, a left rear wheel 23 and a right rear wheel 24 disposed in the rear section of the vehicle body frame 10, a power unit 30 disposed in a center of the vehicle body frame 10, a front row riding space 40 disposed in the front of the power unit 30, a back row riding space 70 disposed in the back of the power unit 30, and a load-carrying platform 90.

Figure 2:
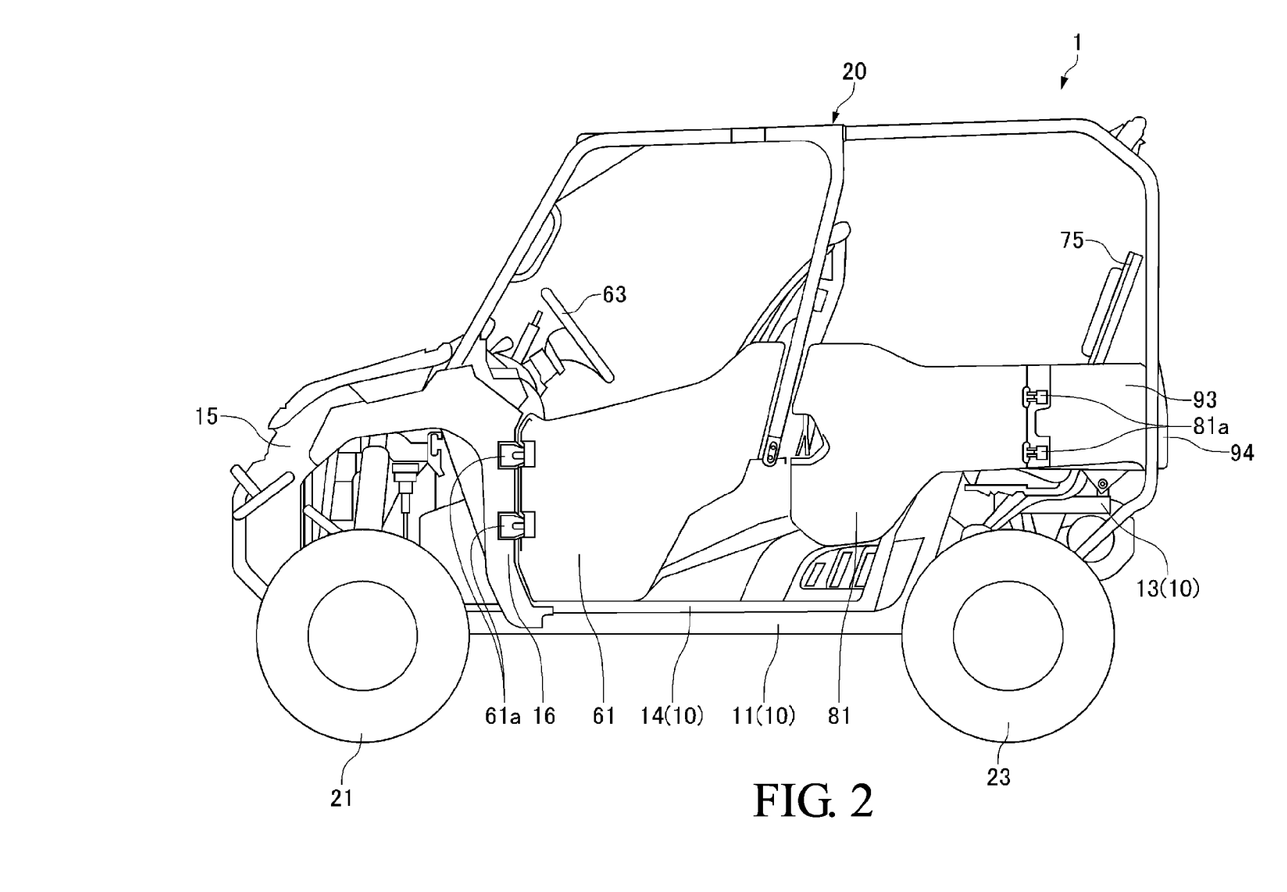
FIG. 2 is a schematic side view of the off-road vehicle shown in FIG. 1.
Figure 3:
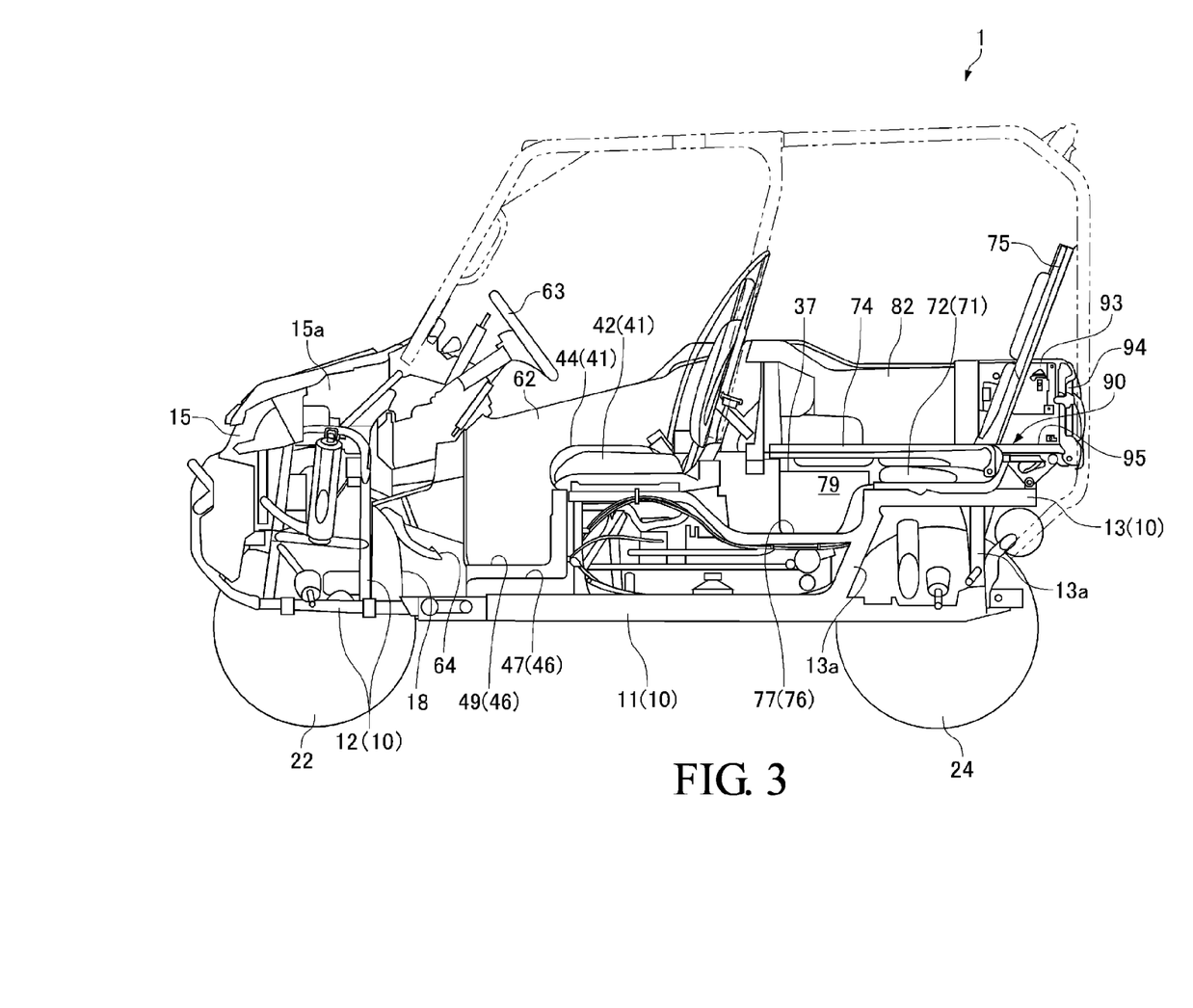
FIG. 3 is a schematic longitudinal side view along the III-III line of FIG. 1.
Figure 4:
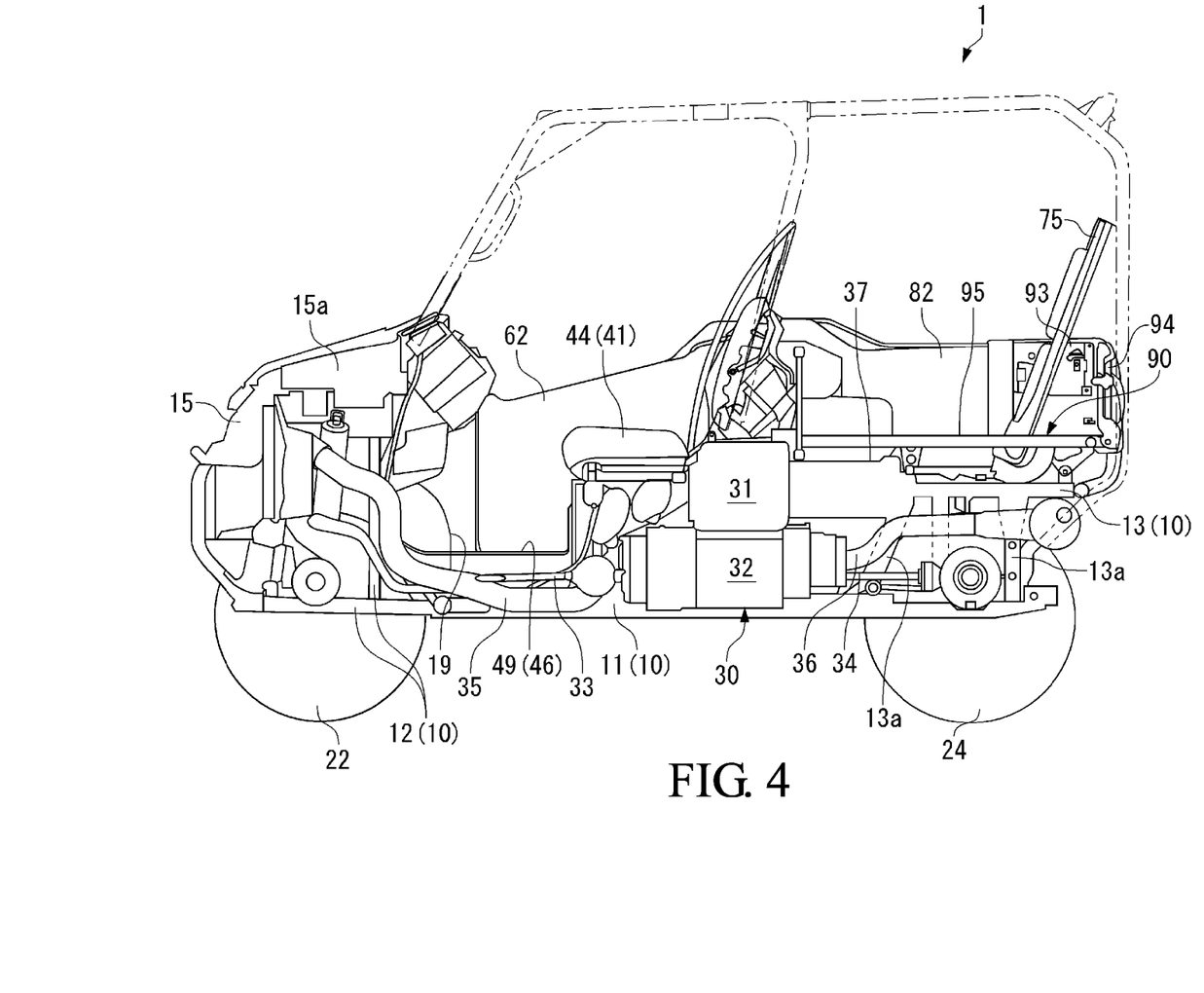
FIG. 4 is a schematic longitudinal side view along the IV-IV line of FIG. 1.

As illustrated in FIGS. 2-4 the vehicle body frame 10 includes a main frame 11, a front frame 12, a rear frame 13, and a side frame 14. The main frame 11, extends in the front-back direction from near the rear end of front wheels 21, 22 in the lower portion of the vehicle 1 to near the rear end of back wheels 23, 24 and also widens in the left-right direction within a predetermined range. The power unit 30 is supported by the main frame 11. The front frame 12 is joined to the front end side of the main frame 11. The left front wheel 21 and the right front wheel 22 are supported in an independent suspension state by the front frame 12 so as to be steerable. A front cover 15 that covers the front region of vehicle 1 is supported by the front frame 12. A luggage compartment 15a is provided on the inner portion of the front cover 15.

The rear frame 13 is integrally joined at a predetermined height in a higher position than the main frame 11 via a leg part 13a that rises from the main frame 11 on the rear side of the main frame 11. The left rear wheel 23 and the right rear wheel 24 are supported in an independent suspension state by the rear frame 13. The side frame 14 is joined to both the left and right sides of the main frame 11. A left support part 16 that supports a front side hinge 61a of a left front door 61 described below and a right support part 17 that supports a front side hinge (not illustrated) of a right front door 62 are supported by the side frame 14. A left wheel well 18 for the left front wheel 21 and a right wheel well 19 for the right front wheel 22, described below, are supported by the side frame 14. A rollover protection system 20 to secure passenger safety covering the riding space for the passengers is coupled to the side frame 14. The rollover protection system 20 is illustrated as a solid line in FIGS. 1 and 2, and is illustrated as dashed lines in FIGS. 3-5.

As shown in FIG. 4, the power unit 30 is mounted near the center of the vehicle body on the main frame 11 substantially equidistant from all wheels: the left front wheel 21, right front wheel 22, left rear wheel 23, and right rear wheel 24. The power unit 30 includes an engine 31 and a transmission 32, and can include various peripheral devices. Examples of the peripheral devices, include, but are not limited to, a front wheel drive train 33, a rear wheel drive train 34, an air intake duct 35, an exhaust duct 36, and the like. The driving force for the engine 31 is transmitted from the engine 31 to the transmission 32 and through the front wheel drive train 33 to the left front wheel 21 and right front wheel 22, respectively. In the same manner, the driving force for the engine 31 is transmitted from the engine 31 to the transmission 32 and through the rear wheel drive train 34 to the left rear wheel 23 and right rear wheel 24, respectively. Because the upper side and the left and right sides of the rear of the power unit 30 are disposed in a region of the back row riding space 70, they are covered by a power unit cover 37 (see FIG. 6), as will be described later.

As shown in FIGS. 1-5, the front row riding space 40 is mainly supported on top of the main frame 11 in front of the power unit 30. The front row riding space 40 is demarcated by front row seats 41 where the front row passengers sit, a front row step floor 46 where the seated passengers place their feet, a dashboard 51 disposed in front of the front row seats 41, a left front door 61 and a right front door 62. The front row riding space 40 is provided with driver operation members such as a steering wheel 63, pedals 64, and the like. The front row riding space 40 is also provided with a storage box 56.

Figure 5:
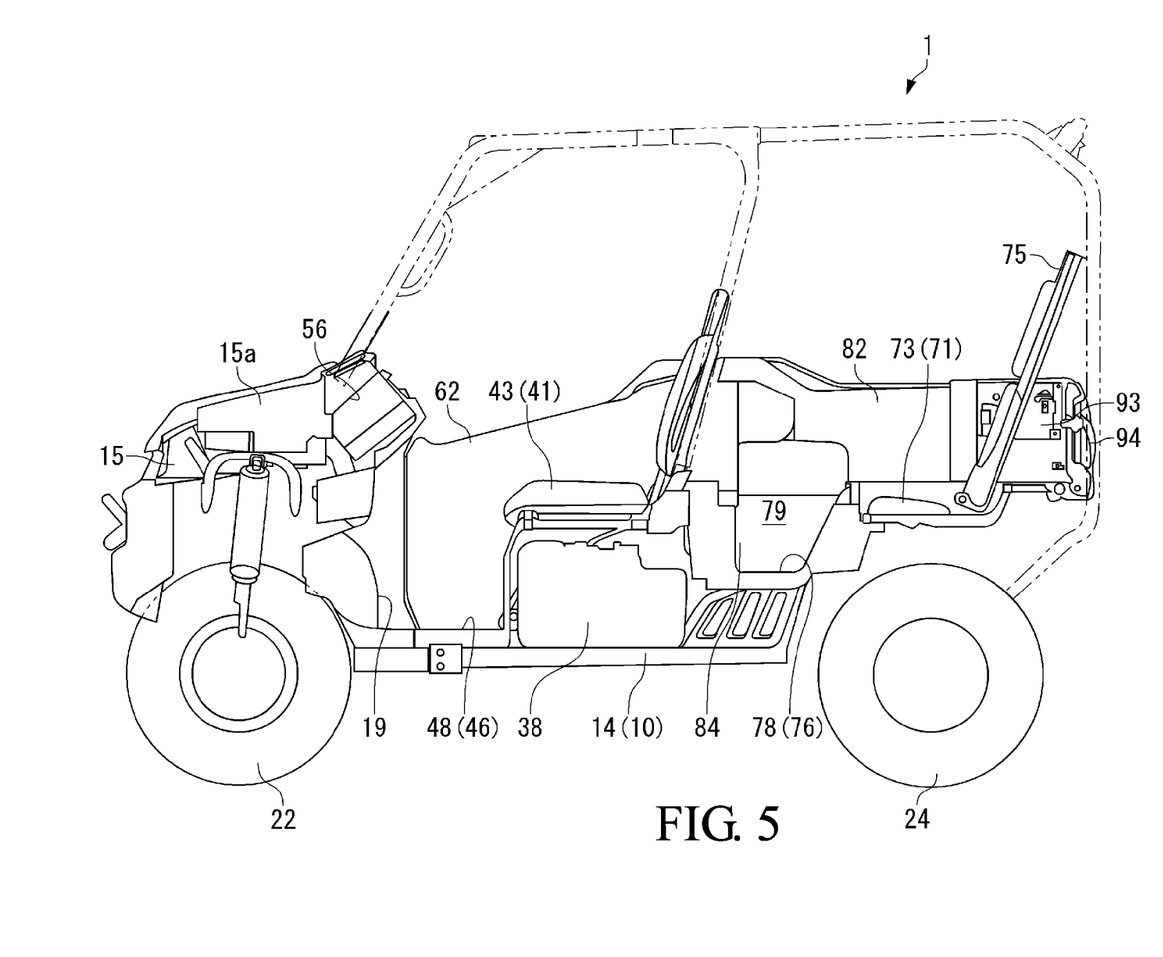
FIG. 5 is a schematic longitudinal side view along the V-V line of FIG. 1.

As shown in FIG. 1, the front row seats 41 are provided with a left seat 42, a right seat 43, and a center seat 44 where three passengers are able to sit side-by-side along the width of the off-road vehicle 1. As illustrated in FIGS. 3-5, the front row seats 41 are supported by the main frame 11 in front of the power unit 30. Specifically, the engine 31 is disposed at the rear underside of the center seat 44, and the transmission 32 is disposed from the lower part of the center seat 44 to the rear side. Therefore, the position in the front-back direction of the center seat 44 is determined by the placement of the power unit 30 on the main frame 11. For example, it would be difficult to situate the center seat 44 behind the power unit 30 due to space constraints and design. As a non-limiting example, a fuel tank 38 is disposed at the lower part of the right seat 43 (see FIG. 5); however, the fuel tank 38 may be disposed in another location on the body frame 10.

As illustrated in FIG. 1, the front row floor 46 includes a left floor 47 where the passenger seated in the left seat 42 places his feet, a right floor 48 where the passenger seated in the right seat 43 places his feet, and a center floor 49 where the passenger seated in the center seat 44 places his feet. The front row floor 46 is supported by the main frame 11 in front of the front row seats 41. A left wheel well 18 for the left front wheel 21 protrudes backward into and crosses into the place of the left front of the left floor 47. In the same manner, the right wheel well 19 for the right front wheel 22 protrudes backward into and crosses the plane of the right front of the right floor 48. In this embodiment, the front-back direction positioning of the left seat 42 and the right seat 43 is determined based on the placement of the left wheel well 18 and the right wheel well 19. For example, it would be difficult to position the left seat 42 on a place along the main frame 11 that would be in front of (further forward) the left wheel well. Additionally, in this embodiment, as shown, it would be difficult to position the right seat 43 in a position in front of the right wheel well 19.

As shown in FIG. 1, the position of the center seat 44 due to the placement of power unit 30 and the position of the left wheel well 18 and the right wheel well 19 is such that the center seat 44 of the front row seats 41 is disposed forward compared to the left seat 42 and the right seat 43.

The engine 31 is disposed at the rear underside of the center seat 44 of the front row seats 41. Therefore, the air intake duct 35 that reaches from the front side of the vehicle 1 to the engine 31 is disposed below the center floor 49 of the front row step floor 46. This causes the height of the center floor 49 of the front row floor 46 to be higher than the height of the left floor 47 and the right floor 48 to avoid the propeller shaft (not illustrated). As a result, the front row floor 46 is divided into the left floor 47, a right floor 48 and the center floor 49 having a height greater than that of the left floor 47 and the right floor 48.

The height of the seat surface of the center seat 44 of the front row seats 41 is disposed above the seat surfaces of the left seat 42 and the right seat 43 in order to secure the necessary height between the seat surface of the center seat 44 and the center floor 49.

The dashboard 51 is disposed in front of the front row seats 41 to restrict the passengers from moving forward. The dashboard 51 is supported by the front frame 12. The dashboard 51 is divided into a left section 52 that is disposed in front of the left seat 42 of the front row seats 41, a right section 53 that is disposed in front of the right seat 43, and a center section 54 that is disposed in front of the center seat 44. As described above, the center seat 44 of the front row seats 41 is disposed forward compared to the left seat 42 and the right seat 43. In accordance with this, the center section 54 of the dashboard 51 is disposed forward compared to the left section 52 and the right section 53 from the passengers' view. The spacing between the dashboard 51 and the left seat 42 and the right seat 43 of the front row seats 41 compared to the left section 52 and the right section 53 of the dashboard 51, is substantially equal.

The rear-end portion of the left section 52 and the rear-end portion of the right section 53 of the dashboard 51 are positioned further rearward than the rear-end portion of the left wheel well 18 and the rear-end portion of the right wheel well 19. The right section (the side with no steering wheel) 53 of the dashboard 51 is provided with a lid 55 that opens and closes towards the passenger. The storage box 56 is provided in the inner space made by closing the lid 55.

As shown in FIG. 1, the left front door 61 and the right front door 62 are supported by the front side hinge 61a (see FIG. 2) on the left support part 16 and the right support part 17 of the side frame 14. The left front door 61 and the right front door 62 covers the left side surface and right side surface of the front row riding space 40. The steering wheel 63 is supported by the front frame 12, and is disposed in front of the left seat (driver's seat) 42 of the front row seats 41. As shown in FIG. 3, the pedals 64 are supported by the front frame 12, and are disposed between the left wheel well 18 of the left floor (driver's seat floor) 47 of the front row step floor 43 and the center floor 49.

As shown in FIGS. 1-6, the back row riding space 70 is situated on the load-carrying platform frame 91 rearward of the power unit 30. The back row riding space 70 is demarcated by back row seats 71 where the back row passengers sit, a back row floor 76 where the seated passengers place their feet, a left rear door 81, and a right rear door 82. A left backboard 74 and a right backboard 75, described below, of the back row seats 71 can be folded, and when in an upright state, can be used as a backrest for passengers seated in the back row seats 71, and when in a folded state, can used as the load-carrying platform 90.

The back row seats 71 can include a left seat 72 and a right seat 73. The left seat 72 and the right seat 73 can be independent of each other, to allow two passengers to sit side-by-side in the vehicle width direction. The left seat 72 and the right seat 73 are identical to each other and the shape of the backboard (left backboard) 74 of the left seat 72 and the shape of the backboard (right backboard) 75 of the right seat 73 are configured so as to be laterally symmetrical to each other. The left backboard 74 is provided with a left extension section 74a that projects to the left side from the top. The right backboard 75 is provided with a right extension section 75a that projects to the right side from the top.

FIG. 1 illustrates left backboard 74 being folded in a stored position to form a portion of the load-carrying platform 90. As shown in FIG. 1, the left seat 72 is in a stowed position. In contrast, the right backboard 75 is in an upright state or usage position, and is used as a backrest for a passenger seated in the right seat 73. Having both the left seat backboard 74 and the right seat backboard 75 upright in a usable position (usage position) so passengers can sit in the left seat 72 and the right seat 73 together is possible with the back row seats 71 (see FIG. 6). Folding both the left backboard 74 and right backboard 75 in towards the back row floor 76 (that is, stowing away both the left seat 72 and the right seat 73), the stored position, forms the load-carrying platform 90 with the back row seats 71 (only partially illustrated in FIGS. 1 and 8).

Figure 8:
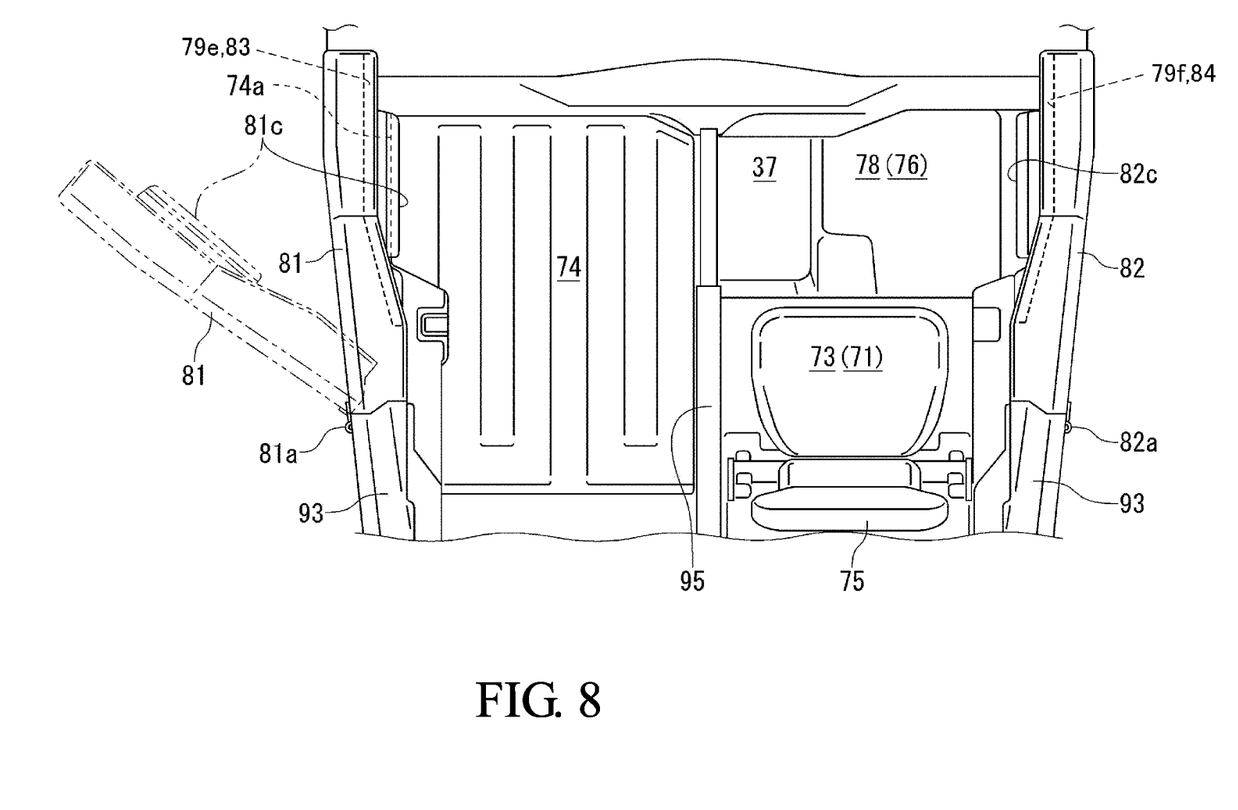
FIG. 8 is an enlarged plan view of FIG. 1 illustrating the rearward storage space and cargo platform formed by the back row seat according to an embodiment of the present disclosure.

In one embodiment, the height of the seat surface of the back row seats 71 is substantially equivalent to the height of the seat surface of the front row seats 41. In the upright position, the left backboard 74 and the right backboard 75 of the back row seats 71 are held in that position by appropriate holding members (not shown). In the same manner, in the folded state or stowed position, the left backboard 74 and the right backboard 75 of the back row seats 71 are held in place by the appropriate holding members. As shown in FIG. 8, the left backboard 74 is held in the stowed position by a left seat stopper 81c, described below, of the left rear door 81. The right backboard 75 is held in the stowed position by a right seat stopper 82c of the right rear door 82.

Figure 6:
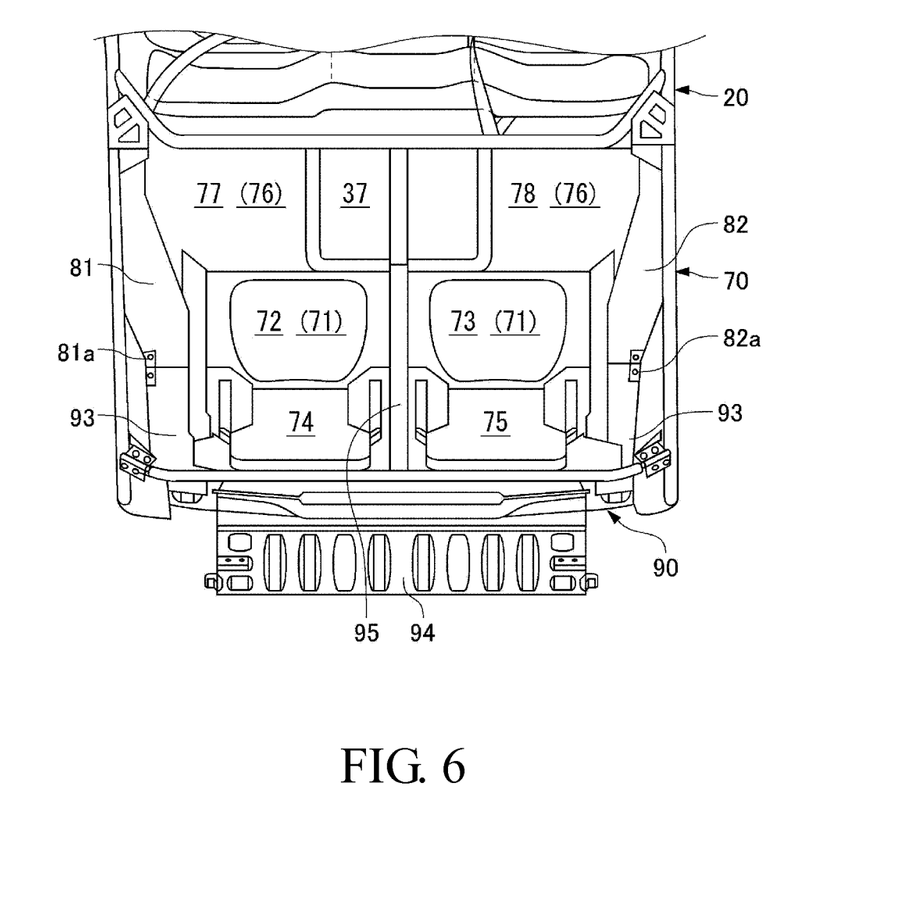
FIG. 6 is an enlarged plan view of the off-road vehicle of FIG. 1 illustrating both the left and right back row seats in a usage position.

As illustrated in FIG. 6, the back row floor 76 is provided with a left floor 77 where the passenger seated in the left seat 72 places his feet, and a right floor 78 where the passenger seated in the right seat 73 places his feet. The power unit cover 37 is disposed from the right side of the left floor 77 to the left side of the right floor 78. Due to the design of the power unit cover 37, the left floor 77 is disposed more toward the left in relation to the position of the seat surface of the left seat 72. The passenger seated in the left seat 72 can avoid the power unit cover 37 by placing his feet on the left floor 77 left of the power unit cover 37. The right floor 78 is disposed more toward the right in relation to the position of the seat surface of the right seat 73. The passenger seated in the right seat 73 can avoid the power unit cover 37 by placing his feet on the right floor 78 right of the power unit cover 37.

As partially shown in FIGS. 1 and 8 when the left backboard 74 and the right backboard 75 of the back row seats 71 are folded inward and in a stowed position, they form the load-carrying platform 90. When both the back row seats 71 are in a stowed position, the space above the back row floor 76 is covered by floorboards 74 and 75. At this time, the space above the back row floor 76 can be used as a rearward storage section 79. The height of the upper surface of the power unit cover 37 is lower than the height of the seat surface of the back row seats 71. Therefore, the rearward storage section 79 is integrally configured in the space above the back row floor 76. Specifically, the rearward storage section 79 is configured by the common space formed by the space above the left floor 77, the space above the right floor 78, and the space between the lower surface of the load-carrying platform 90 and the upper surface of the power unit cover 37.

As shown generally in FIGS. 1, 6, 7, and 8, the left rear door 81 and the right rear door 82 are supported by the rear side hinges 81a and 82a on a left and right load-carrying platform framework 93, described below, of the load-carrying platform 90. The left rear door 81 and the right rear door 82 cover the left side surface and the right side surface, respectively of the space above the back row floor 76 on the front lower side. The height of the top edge of the left rear door 81 and the right rear door 82 is greater than the height of the upper surface of the load-carrying platform 90. Therefore, on the upper side, the left rear door 81 and the right rear door 82 cover more of the left side surface and the right side surface of the back row riding space 70 of the upper part than the load-carrying platform 90. The left rear door 81 is provided with a left recessed portion 83 that recedes in toward the outside (left side) in a position that covers the left side surface of the space above the left floor 77. With the left rear door 81, a left seat stopper 81c is provided adjacent to the upper part of the left recessed portion 83. The upper end of the left recessed portion 83 and the stopper surface of the left seat stopper 81c are connected. The right rear door 82 is provided with a right recessed portion 84 that recedes in toward the outside (right side) in a position that covers the right side surface of the space above the right floor 78. The right seat stopper 82c is provided on the upper part of the right recessed portion 84 on the right rear door 82. The upper end of the right recessed portion 84 and the stopper surface of the right seat stopper 82c are connected.

Figure 7:
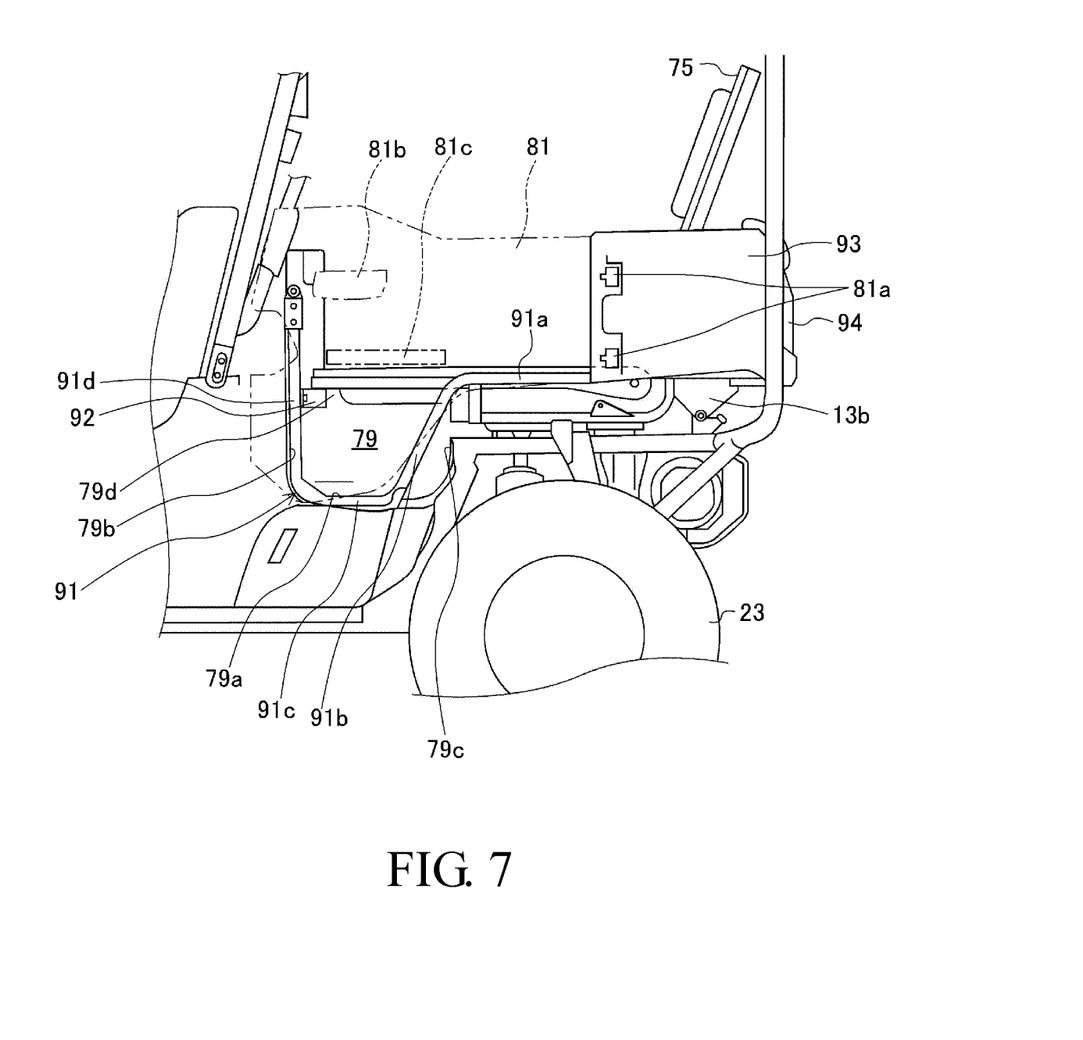
FIG. 7 is an enlarged side view of the off-road vehicle of FIG. 2 illustrating the rearward storage space by virtually showing the left rear door.

As shown in FIG. 7, the load-carrying platform 90 is demarcated by a left and right load-carrying platform frame 91 supported by the rear frame 13 and a stay 13b, a cross-member 92 that connects the front sections of the load-carrying platform frame 91 to each other, the left backboard 74 and the right backboard 75 in the folded state, the load-carrying platform framework 93 provided on the left and right of the rear of the left backboard 74 and the right backboard 75, the left rear door 81 and the right rear door 82, and a back door 94. A part of the load-carrying platform 90 is combined with the back row riding space 70.

The load-carrying platform 91 is configured from a horizontal portion 91a that extends forward from the stay 13b, a slanted portion 91b that extends forward and down from the front end of the horizontal portion 91a, a base portion 91c that extends forward from the bottom edge of the slanted portion 91b, and a standing portion 91d that rises from the front end of the base portion 91c. The cross-member 92 is attached to an intermediate height of the standing portion 91d. In the folded state, the top edge of the left backboard 74 and the right backboard 75 is supported by the cross-member 92. A doorknob 81c of the left rear door 81 is provided on the front side of the left rear door 81. A doorknob of the right rear door 82 is not illustrated.

The left rear door 81 is supported by the rear side hinge 81a on the load-carrying platform framework 93 on the left. The right rear door 82 is supported by the rear side hinge 82a on the load-carrying platform framework 93 on the right. The back door 94 is supported by the load-carrying platform framework 93 on the left and right, with the lower side hinged between the load-carrying platform framework 93 on the left and right. A center frame 95 for the load-carrying platform 90 is disposed between the left seat 73 and the right seat 74. The upper surface of the center frame 95 for the load-carrying platform 90 and the upper surfaces of the left backboard 74 and the right backboard 75 become one surface when the left and right seats 72 and 73 are in a stowed position.

As illustrated in FIG. 7, the rearward storage section 79 is a space enclosed by a base wall 79a, a front wall 79b, a rear wall 79c, a top wall 79d, a left wall 79e, and a right wall 79f. The base wall 79a is configured from the floor surface of the left floor 77 and the floor surface of the right floor 78 that connect the area between the left and right base portions 91c of the load-carrying platform frame 91. The front wall 79b is configured from the front surface of the left floor 77 and the front surface of the right floor 78, that connect between the left and right risen floors 91d of the load-carrying platform frame 91. The rear wall 79c is configured from the rearward surface that rises from the left floor 77 and the rearward surface that rises from the right floor 78 on the rear of the right and left slanted portions 91b of the load-carrying platform frame 91. The top wall 79d is configured from the lower surface of the folded left backboard 74 and the folded right backboard 75, and from the lower surface of the center frame 95 of the load-carrying platform between both backboards 74 and 75. The left wall 79e is configured particularly from the left recessed portion 83 of the right side surface of the left rear door 81. The right wall 79f is configured particularly from the right recessed portion 84 of the left side surface of the right rear door 82.

The operation of the rearward storage structure 79 of the off-road vehicle 1, is described. In the back row riding space 70, when the left backboard 74 and the right backboard 75 of the back row seats 71 are folded and used as the load-carrying platform 90, the upper part of the upper space of the back row floor 76 is covered by the left backboard 74 and the right backboard 75, the side is covered by the left rear door 81 and the right rear door 82, and the upper space thereof enclose and become the rearward storage section 79. The height of the top edge of the left rear door 81 and the right rear door 82 are greater than the height of the upper surface of the load-carrying platform 90.

Figure 9:
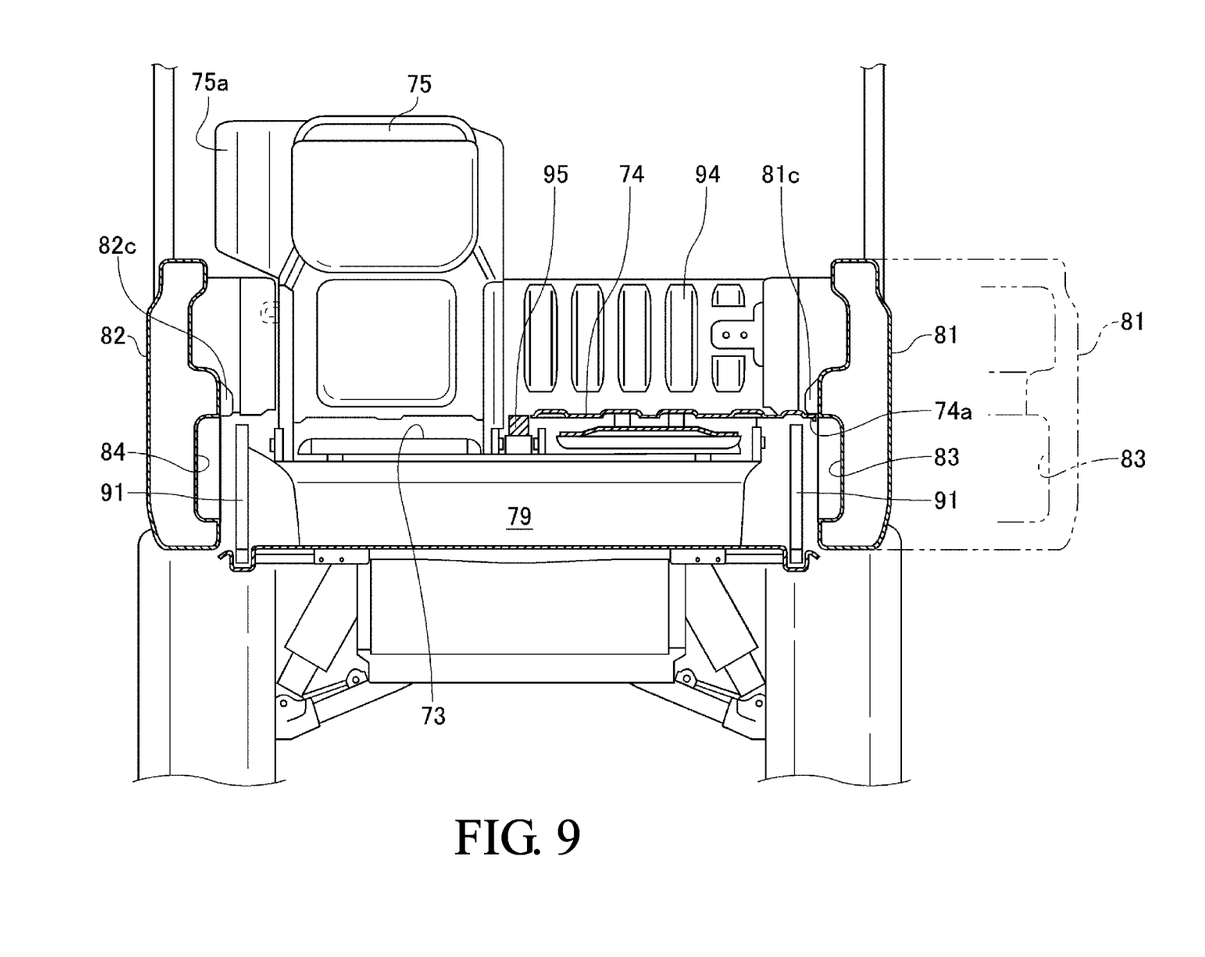
FIG. 9 is an enlarged longitudinal front view of the rear portion of the off-road vehicle illustrating the rearward storage space according to an embodiment of the present disclosure.

As depicted in FIGS. 1, 8 and 9, the rearward storage section 79 can be accessed by opening and closing the left rear door 81 or the right rear door 82. When the left rear door 81 and the right rear door 82 are closed, the left rear door 81 and the right rear door 82 enclose the load-carrying platform 90. When cargo is placed on the load-carrying platform 90, the rearward storage unit 79 can be accessed by opening the left rear door 81 or the right rear door 82, without having any effect on cargo on the load-carrying platform.

The left rear door 81 and the right rear door 82 are supported by the rear side hinges 81a and 82a on the left and right load-carrying platform framework 93 of the load-carrying platform 90, and cover the left side surface and the right side surface of the rearward storage section 79 on the front lower side. The left rear door 81 and the right rear door 82 open wide on the front side that covers the left side surface and the right side surface of the rearward storage section 79.

As shown in FIG. 8, the rearward storage section 79 is configured by the common space formed by the space above the left floor 77, the space above the right floor 78, and the space between the lower surface of the load-carrying platform 90 and the upper surface of the power unit cover 37. Because the rearward storage section 79 extends in the vehicle width direction between the left rear door 81 and the right rear door 82, long cargo that extends from the left to the right of the vehicle can be stored.

The left rear door 81 is provided with a left recessed portion 83 that recedes in toward the outside (left side) in a position that covers the left side surface of the space above the left floor 77. The right rear door 82 is provided with a right recessed portion 84 that recedes in toward the outside (right side) in a position that covers the right side surface of the space above the right floor 78. The strength of the left rear door 81 and the right rear door 82 is secured by the left recessed portion 83 and the right recessed portion 84. The length in the vehicle width direction of the rearward storage section 79 is extended by the left recessed portion 83 of the left rear door 81 and the right recessed portion 84 of the right rear door 82.

The following types of effects are achieved according to an embodiment of the present disclosure. (1) When the left backboard 74 and the right backboard 75 of the back row seats 71 are used as the load-carrying platform 90, the upper part of the space above the back row floor 76 is covered by the left backboard 74 and the right backboard 75, and the side is covered by the left rear door 81 and the right rear door 82, and the upper space thereof is used as the rearward storage section 79. By this, the rearward storage section 79 can be accessed by opening and closing the left rear door 81 or the right rear door 82, thereby providing excellent convenience of the rearward storage section 79. (2) When the left rear door 81 and the right rear door 82 are closed, the left rear door 81 and the right rear door 82 are used as the framework that encloses the load-carrying platform 90. In this instance, when cargo is placed on the load-carrying platform 90, the rearward storage section 79 can be accessed by opening the left rear door 81 or the right rear door 82, without having any effect on the cargo in the load-carrying platform 90. (3) The left rear door 81 and the right rear door 82 are supported by the rear side hinges 81a and 82a, and cover the left side surface and the right side surface of the rearward storage section 79 on the front lower side. By this, the left rear door 81 and the right rear door 82 make the opening of the rearward storage section 79 wider because the front side covering the left side surface and the right side surface of the rearward storage section 79 can open wide, and as a result, convenience can be enhanced. (4) The rearward storage section 79 is configured by the space above the left floor 77, the space above the right floor 78, and the common space therebetween. Because of this, the rearward storage section 79 can store long cargo that extends from the left to the right of the vehicle because the space between the left rear door 81 and the right rear door 82 extends in the vehicle width direction; furthermore, the operations of loading and unloading the long cargo are simplified. (5) The left rear door 81 is provided with a left recessed portion 83 that recedes in toward the outside (left side) in a position that covers the left side surface of the space above the left floor 77. The right rear door 82 is provided with a right recessed portion 84 that recedes in toward the outside (right side) in a position that covers the right side surface of the space above the right floor 78. As a result, the strength of the left rear door 81 and the right rear door 82 can be ensured by the left recessed portion 83 and the right recessed portion 84. At the same time, the size of the storage space of the rearward storage section 79 can be increased by extending the length of the rearward storage section 79 in the vehicle width direction through the left recessed portion 83 of the left rear door 81 and the right recessed portion 84 of the right rear door 82.

FIG. 9 illustrates an enlarged longitudinal front view of the rear portion of an off-road vehicle provided with a rearward storage structure 79 according to a second embodiment of the present disclosure. The off-road vehicle according to the second embodiment is substantially the same as the off-road vehicle 1 according to the first embodiment. Therefore, by illustrating the same portions with identical reference numerals as the numerals used for the off-road vehicle 1, a duplicate description can be omitted.

As illustrated in FIG. 9, the off-road vehicle does not include a power unit cover 37 between the left floor 77 and the right floor 78 of the back row floor 76. Therefore, the configuration of the floor surface of the back row floor 76 is flat from the left edge to the right edge, creating a continuous back row floor.

According to this second present embodiment, the following effects are achieved in addition to the above describe effects. (6) The configuration of the floor surface of the back row floor 76, which configures the base surface of the rearward storage section 79, is flat from the left edge to the right edge. As a result the rearward storage section 79 can store cargo that is long, extending from the left to the right of the vehicle, and has a large cross section, because the large cross-sectional area between the left rear door 81 and the right rear door 82 extends in the direction of the vehicle width; furthermore loading and unloading the cargo that is long and has a large cross-sectional area becomes easier.

Note that, in the above embodiment, the back row seats 71 can be configured to provide a left seat 72 and a right seat 73 which are independent of each other, such that two passengers are able to sit side-by-side in the vehicle width direction, but the present disclosure is not limited thereto. For example, the back row seats 71 can be configured to have three seats such that three passengers can sit side-by-side in the vehicle width direction.

The foregoing is a description of embodiments of the present disclosure, but the present disclosure is not limited to the embodiments described above, and various modifications may be made thereto within the scope of the present disclosure.

What is claimed is:

1. A storage structure of an off-road vehicle, comprising:
    a front-row seat;
    a back row seat, wherein the back row seat can switch between a usage position for passenger seating and a stowed position;
    a back row floor where a passenger when seated in the back row seat can place his feet when the back row seat is in the usage position; and
    rear doors;
    wherein the back row seat covers an upper part of an upper space of the back row floor in the stowed position
    wherein the rear doors cover side parts of the upper space of the back row floor; and
    wherein a front wall extends upwardly from the back row floor to cover a front part of the upper space of the back row floor, wherein the upper space is usable as an enclosable storage space.

2. The storage structure of the off-road vehicle according to claim 1, wherein:
    the back row seat includes backboards that are configured as a backrest for passengers seated in the back row seat when in the usage position; and
    wherein the backboard of the back row seat is configured as a floor panel of the load-carrying platform when the back row seat is in the storage position, and wherein the backboard is situated lower than the upper portion of the rear doors.

3. The storage structure of the off-road vehicle according to claim 1, wherein the rear doors open to the outer side of the vehicle body frame using a rear side as a hinge.

4. The storage structure of the off-road vehicle according to claim 1, wherein the back row seat includes a plurality of seats in a line from left to right,
the back row floor includes a plurality of floors where passengers seated in the plurality of seats may place their feet; and
wherein when the plurality of seats are in a stowed position, the upper space of the back row floor is common between the plurality of floors.

5. The storage structure of the off-road vehicle according to claim 1, wherein each of the rear doors include a recessed portion that recedes into a portion of the door panel to include a side part of an upper space of the back row floor.

6. A storage structure of an off-road vehicle, comprising:
a vehicle body frame;
at least one front row seat disposed on the vehicle body frame;
at least one back row seat disposed behind the front row seat on the vehicle body frame, wherein the back row seat is configured to operate in a usage position or a stowed position;
at least one back row floor adjacent to the at least one back row seat, wherein the at least one back row floor is configured to provide an area for passenger feet when the at least one back row seat is in the usage position and wherein the at least one back row floor is configured to form a part of the storage structure when the back row seat is in the stowed position;
a cross member extending across the vehicle for supporting a portion of the at least one back row seat in the stowed position; and
at least one rear door;
wherein when the at least one rear door is closed and the at least one back row seat is in the stowed position, the at least one rear door, the back row floor and the at least one back row seat define a portion of the storage structure enclosing a storage space.

7. The storage structure of the off-road vehicle of claim 6, wherein the at least one back row seat includes at least one backboard.

8. The storage structure of the off-road vehicle of claim 7, wherein the backboard is configured as a backrest for passengers, when the back row seat is in the usage position.

9. The storage structure of the off-road vehicle of claim 7, wherein the at least one backboard of the at least back row seat is configured as a floor panel of the load-carrying platform when the back row seat is in the stowed position, and wherein the at least one backboard is situated below an upper portion of the at least one rear door.

10. The storage structure of the off-road vehicle of claim 6, wherein the at least one rear door swings away from the vehicle body frame using a rear side of the vehicle as a hinge.

11. The storage structure of the off-road vehicle according claim 6, wherein the at least one back row floor includes a plurality of floors configured to receive passenger feet, when the at least one back row seat is in a usage position.

12. The storage structure of the off-road vehicle according to claim 6, wherein each of the rear doors includes a recessed portion, the recessed portion receding into a portion of a door panel of each of the rear doors, wherein the storage space includes a side part of an upper space of the back row floor.

13. The storage structure of the off-road vehicle according to claim 6, wherein the back row floor includes a first floor and a second floor.

14. The storage structure of the off-road vehicle according to claim 13, wherein the first floor creates a first storage space when the corresponding back row seat is in the stowed position and the second floor creates a second storage space when the corresponding back row seat is in the stowed position.

15. A storage structure of an off-road vehicle, comprising:
a vehicle body frame;
at least one front row seat disposed on the vehicle body frame;
a back row seat disposed behind the front row seat on the vehicle body frame, wherein the back row seat includes a first seat and a second seat configured to operate in a usage position or a stowed position;
a back row floor adjacent to the back row seat, wherein the back row floor is flat forming a continuous floor, wherein the continuous floor is configured to provide an area for passenger feet when the first or second back row seat is in the usage position and wherein the continuous floor is configured to form a part of the storage structure when the first or second back row seats are in the stowed position; and
a first rear door adjacent to the first back row seat and a second rear door adjacent to the second back row seat;
wherein the first seat includes a first extension section that extends laterally to the first rear door when the first seat is in a stowed position and forms a portion of the storage structure; and
wherein the second seat includes a second extension section that extends laterally to the second rear door when the second seat is in a stowed position and forms a portion of the storage structure.

16. The storage structure of the off-road vehicle of claim 15, further including a load carrying platform formed by one or both of the first or second back row seats.

17. The storage structure of the off-road vehicle of claim 15, including a storage space formed by the storage structure, wherein the storage space is configured to extend the width of the off-road vehicle between the first and second rear doors.

18. The storage structure of the off-road vehicle of claim 17, wherein the storage space is accessible by opening one or both of the first or second rear doors.

19. The storage structure of the off-road vehicle according to claim 1, wherein:
the back row seat includes a plurality of seats that can be independent from each other in a line from left to right; and
wherein each of the plurality of seats can be selectively placed in the stowed position or the usage position.

20. The storage structure of the off-road vehicle according to claim 6, wherein:
the back row seat includes a plurality of seats that can be independent from each other in a line from left to right; and
wherein each of the plurality of seats can be selectively placed in the stowed position or the usage position.

* * * * *